March 29, 1960 E. GRANBERG 2,930,416
CHAIN SAW ATTACHMENT
Filed Feb. 17, 1958
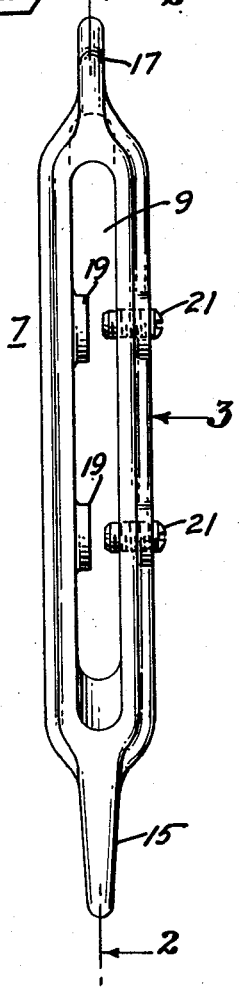
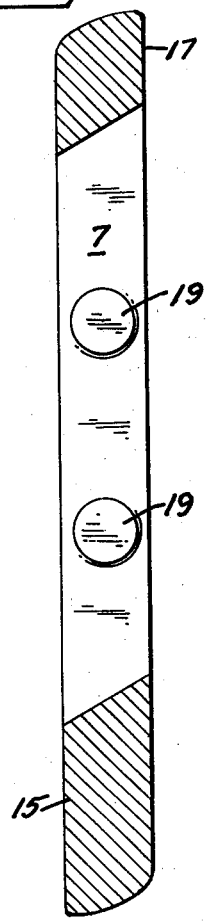
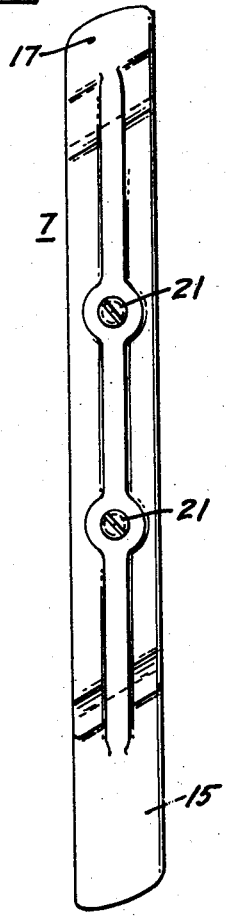
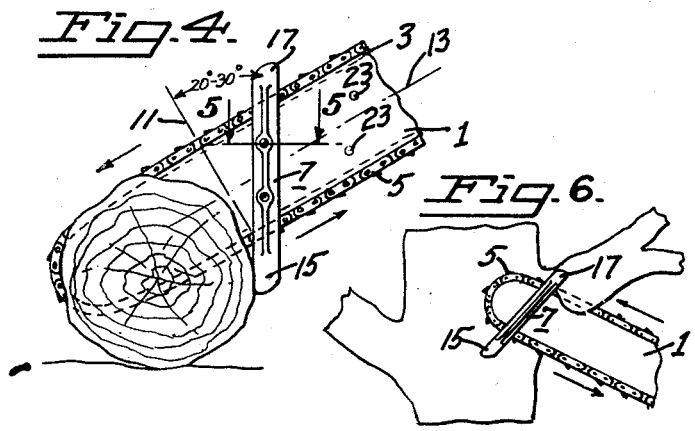
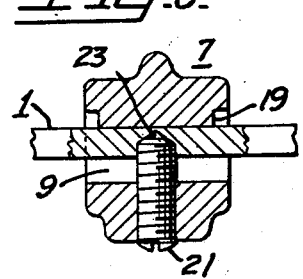
INVENTOR.
ELOF GRANBERG
BY Bruce & Brosley
HIS ATTORNEYS

2,930,416
CHAIN SAW ATTACHMENT

Elof Granberg, Richmond, Calif.

Application February 17, 1958, Serial No. 715,575

3 Claims. (Cl. 143—32)

My invention relates to chain saws and more particularly to an attachment for such saws.

Among the objects of my invention are:

(1) To provide a novel and improved attachment for chain saws;

(2) To provide a novel and improved chain saw attachment which facilitates the handling of such a saw;

(3) To provide a novel and improved chain saw attachment which expands the range of utility of such a saw;

(4) To provide a novel and improved chain saw attachment capable of fulfilling the foregoing objects and which, at the same time, is of simple construction and readily applicable to the saw.

Additional objects of my invention will be brought out in the following description of a preferred embodiment of the same, taken in conjunction with the accompanying drawings, wherein Figure 1 is an edge view of the chain saw attachment of the present invention;

Figure 2 is a view in section taken in the plane 2—2 of Figure 1;

Figure 3 is a side view taken in the direction of the arrow 3 of Figure 1;

Figures 4 and 6 are views depicting types of operations permitted by the attachment of the present invention;

Figure 5 is a view in section taken in the plane 5—5 of Figure 4.

A chain saw to which the present invention relates involves a web 1 affixed at one end to a portable drive motor (not shown) and having a peripheral track 3 for supporting and guiding a chain 5 of saw teeth driven by such motor.

The attachment, comprising the present invention, involves a bar 7 having a longitudinal slot 9 therethrough of a width exceeding the thickness of the chain 5 and of a length exceeding the width of the saw sufficiently to permit slipping the bar over the saw and adjusting it to a backward tilting angle of the order of 20 to 30 degrees with a line 11 normal to the longitudinal axis 13, and without interfering with travel of the chain when at such angle.

Each end of the bar terminates in a narrow extension, 15, 17, respectively, one of which 15 may preferably be slightly tapered to form a wedge.

At spaced locations along one inner surface of the slot are a pair of flat web centering bosses 19, while at directly opposite points, the bar carries a pair of adjustable set screws 21. These constitute means for clamping the bar to the web of the saw following assembling of the bar and positioning the same thereon at the desired angle, the bosses serving to center the web in the slot and assure adequate side clearance for the chain as it moves through the slot.

When so assembled, either attachment extension may function as an initial abutment in using the saw, the particular extension utilized, depending on the character of the operation. As the saw penetrates the work, the slotted portion of the bar gradually takes over this function of the extension.

Illustrative of the expanded range of use to which a chain saw may be put when utilizing the attachment of the present invention, is the cutting or bucking of a small log lying on the ground. The sawing of such a log with a chain saw, as such, is a practical impossibility without first stabilizing or anchoring the log, and even then the problem would be a difficult one, as sawing would, from a practical standpoint, have to be more or less confined to the end portion of the saw, while utilizing the under side of the saw for cutting.

Referring to Figure 4, it will be noted in this connection, that the lower end extension 15 of the attachment, acts as an abutment against which the log will be forced by the traveling teeth of the chain, thereby stabilizing both the log and saw with respect to each other, and by such relationship, further neutralizing the tendency of the saw as a unit, to move across the work. This offers the added advantage of relieving the operator of the necessity of resisting such movement.

Figure 6 is illustrative of another operation, referred to as underbucking, which is made possible with ease through the use of the present invention. In this operation, cutting is accomplished at the upper side of the saw, utilizing the upper extension 17 of the attachment as the abutment for initially abutting the branch and neutralizing the tendency of the saw, as a unit, to travel across the work.

Inasmuch as the attachment is exposed to strong forces when in use, which might conceivably rotate the bar into the path of the teeth on the traveling chain, it is important to safeguard against such an occurrence. This can be accomplished simply and readily by drilling a recess 23 in the web of the saw at the proper point of engagement of each of the set screws, such recess preferably having a cylindrical wall to provide maximum safety against the set screws slipping out of said recesses when the bar is exposed to the forces encountered in use.

More than one set of such recesses is contemplated to provide for different positional settings of the attachment.

The proper location of such recesses further enables the attachment to be quickly and properly assembled to the saw with assurance that the attachment will not interfere with the saw teeth.

When unattached to a saw, the device may be employed as a wedge, either for splitting a log or for spreading a saw cut, the tapered extension 15 being employed as the entering edge of the wedge when the device is used for this purpose.

From the foregoing description of my invention in its preferred form, it will be apparent that the same may be subject to alteration or modification without departing from the underlying principles involved, and I accordingly do not desire to be limited in my protection to the specific details illustrated and described, except as may be necessitated by the appended claims.

I claim:

1. In combination, a chain saw comprising a web having a peripheral track and a chain of saw teeth around said track; a bar having a longitudinal slot of a length and width sufficient to permit said bar to be slipped over said chain saw and assume a position without interfering with free movement of said chain; and means affixing said bar on said saw in said position, said means including at least one web centering boss on one side surface only of said slot and extending to said web when said web occupies substantially a mid-position in said slot, a corresponding number of clamping screws in said bar opposite said bosses, and said web having a recess in line with each clamping screw and adapted to receive the end of its associated screw when said screw is threaded into engagement with said web.

2. In combination, a chain saw comprising a web having a peripheral track and a chain of saw teeth around said track; a bar having a longitudinal slot of a length and width sufficient to permit said bar to be slipped over said chain saw and assume an angle with a line normal to the longitudinal axis of said saw and without interfering with free movement of said chain, said bar at each end terminating in a narrow extension; and means affixing said bar on said saw in said angular position, said means including a plurality of web centering bosses on one side surface only of said slot and extending to said web when said web occupies substantially a mid-position in said slot, a plurality of set screws in said bar opposite said bosses and said web having a recess in line with each set screw and adapted to receive the end of its associated set screw when said set screw is threaded into engagement with said web.

3. In combination, a chain saw comprising a web having a peripheral track and a chain of saw teeth around said track; a bar having a longitudinal slot of a length and width sufficient to permit said bar to be slipped over said chain saw and assume an angle of the order of 20–30 degrees with a line normal to the longitudinal axis of said saw and without interfering with free movement of said chain, said bar at each end terminating in a narrow extension; and means affixing said bar on said saw in said angular position, said means including a plurality of web centering bosses on one side surface only of said slot and extending to said web when said web occupies substantially a mid-position in said slot, a plurality of set screws in said bar opposite said bosses, and said web having a recess in line with each set screw and adapted to receive the end of its associated set screw when said set screw is threaded into engagement with said web.

References Cited in the file of this patent

UNITED STATES PATENTS

| | | |
|---|---|---|
| 2,642,901 | Hayden | June 23, 1953 |
| 2,779,359 | Koski | Jan. 29, 1957 |
| 2,797,717 | Budd | July 2, 1957 |